3,478,054
1-SUBSTITUTED-2-ALKYL-3-(2-DIALKYLAMINO-
ETHYL)INDOLES
Thomas W. Pattison, King of Prussia, and David R.
Herbst, Wayne, Pa., assignors to American Home
Products Corporation, New York, N.Y., a corporation
of Delaware
No Drawing. Filed Feb. 20, 1967, Ser. No. 617,079
Int. Cl. C07d 27/56
U.S. Cl. 260—326.12                        13 Claims

ABSTRACT OF THE DISCLOSURE 1-alkanoyl-, cycloalkylcarbonyl-, aralkyl- and arylsulfonyl derivatives (I) of 2-alkyl-3-[(2-dialkylamino) ethyl]indloes (II) are prepared by treating said indoles first with an alkali metal hydride or amide, then with an alkanoyl-, cycloalkylcarbonyl-, aralkyl- or arylsulfonyl halide. Compounds (I) have antibacterial, anti-inflammatory and hypotensive activity.

This invention relates to new and useful indole compounds. More particularly, it is concerned with 1-substituted-2 - alkyl - 3-(2-dialkylaminoethyl)indoles having valuable biological properties, being especially useful as antibacterials, anti-inflammatories and hypotensives.

It is, accordingly, a principal object to provide compounds effective to treat bacterial infections, inflammatory conditions and for the relief of hypertension, which are particularly effective, have low toxicity, lower central nervous system activity and which are characterized by high levels of activity for extended periods of time.

DESCRIPTION OF THE INVENTION

The compounds contemplated by this invention are those of Formula I:

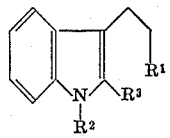

(I)

wherein $R^1$ is di(lower)alkylamino; $R^2$ is (lower) alkanoyl, cycloalkylcarbonyl; benzyl, (lower)alkylbenzyl, (lower)alkoxybenzyl, halobenzyl, phenylsulfonyl, (lower)alkylphenylsulfonyl, (lower) alkoxyphenylsulfonyl, halophenylsulfonyl or dihalophenylsulfonyl; and $R^3$ is (lower)alkyl, and pharmacetucially-acceptable acid addition salts thereof.

Special mention is made of valuable species within Formula I. These are especially active in therapy and are: 1-(p-chlorobenzyl)-2 - methyl - 3-[(2-dimethylamino)-ethyl]indole, especially the hydrochloride; 2-methyl-3-(2-dimethylamino)ethyl - 1 - (p - methylbenzyl)indole, especially the hydrochloride; 1-cyclopropylcarbonyl-2-methyl-3-[(2-dimethylamino)ethyl]indole, especially the hydrochloride; 1-cyclopentyl-carbonyl-2-methyl-3-[(2-dimethylamino)ethyl]indole, especially the hydrochloride; 1 - (3,4 - dichlorophenylsulfonyl) - 3-(2-diethylamino)-ethyl-2-methylindole, especially the hydrochloride; 3-(2-diethylamino)ethyl - 1-(p-fluorobenzyl)-2-methylindole, especially the hydrochloride; 1 - cyclohexycarbonyl - 2-ethyl - 3-[(2 - diethylamino)ethyl]indole, especially the maleate; 1-cyclopropylcarbonyl-3-(2-diethylamino)ethyl-2-isopropylindole, especially the maleate; and 3-(2-diethylamino)ethyl - 2-isopropyl-1-(p-methylbenzyl)indole, especially the maleate.

When used herein and in the appended claims the term "(lower)alkyl" contemplates straight or branched hydrocarbon chains of from about 1 to about 6 carbon atoms, illustrative members of which are methyl, ethyl, n-propyl, i-propyl, n-butyl, s-butyl, t-butyl, n-pentyl, n-hexyl, 2-methylpentyl, and the like. The term "(lower) alkanoyl" contemplates alkanoyl groups containing from about 2 to about 6 carbon atoms in straight or branched chain arrangements, illustrative members of which are acetyl, n-propionyl, n-butyroyl, i-butyroyl, n-pentanoyl, n-hexanoyl, 2-methylpentanoyl, and the like. The term "(lower)alkoxy" contemplates alkoxy groups containing from about 1 to about 6 carbon atoms in straight or branched chain arrangements, illustrative members of which are methoxy, ethoxy, n-propoxy, i-propoxy, n-butoxy, s-butoxy, t-butoxy, n-pentoxy, n-hexyloxy, 2-methylpentoxy, and the like. The term "halo" includes chlorine, bromine, fluorine and iodine.

The new compounds of this invention are prepared by first treating a suspension of a selected indole of Formula II.

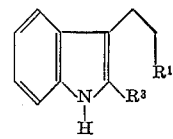

(II)

wherein $R^1$ and $R^3$ are as defined hereinabove, in an inert solvent, such as a di(lower)alkylamide, e.g., dimethylformamide or an aromatic hydrocarbon, e.g., toluene, with a hydrogen-displacement agent, such as an alkali metal hydride or amide, preferably sodium hydride, at a temperature of from about 25° C. to about 100° C. for a period of from about 1 to about 4 hours. Thereafter, an aralkyl, alkanoyl, cycloalkylcarbonyl, or arylsulfonyl halide is added to the reaction mixture at a temperature of from about 25° C. to about 100° C. and allowed to react for from about 16 to about 24 hours, preferably for about 20 hours. Distillation of the solvent, solution of the residue in benzene, washing with dilute aqueous potassium bicarbonate solution, then with water, drying and evaporation of the solvent, provide the crude base which can be chromatographically purified on an alumina column.

The 1-alkanoyl, cycloalkylcarbonyl, aralkyl or arylsulfonyl free base derivatives of Formula I obtained by the foregoing sequence are convertible into their acid addition salts, such as the hydrogen chloride addition salt, by treating an etheral solution of the free base with either gaseous or isopropanolic hydrogen chloride. Other acid salts may also be prepared by treating the free base form of the compounds described with other organic or inorganic acids. Acids suitable for this purpose are hydrobromic, sulfuric, phosphoric, nitric, benzoic, methanesulfonic, p-toluenesulfonic, benzenesulfonic, naphthalenesulfonic, salicylic, glycolic, acetic, maleic, succinic, tartaric, stearic, palmitic, citric, glutaric, lactic, pamoic and the like.

Intermediates for indoles of Formula II, used as starting materials are known or are prepared from N-acyl-o-toluidines by methods described in detail in, for example, F. Piozzi and M. Langella, Gazz. Chem. Ital., 93, 1382 (1963) and C. Cardani, F. Piozzi and G. Casnati, ibid. 85, 263 (1955). Then, employing the procedure of M. E. Spector and W. C. Anthony, U.S. 2,870,162, the intermediates are converted via the amides into the requisite compounds of Formula II.

Compounds of Formula I herein are valuable pharmaceutical agents. In particular, the new compounds possess antibacterial, anti-inflammatory and hypotensive activity. This makes them useful to treat diseases in warm-blooded animals which are commonly alleviated with such agents.

When used for the purposes described above, it may be desirable according to conventional pharmaceutical practice to combine the specific compound selected into compositions suitable for enteral or parenteral administration by combining the same with a pharmaceutically acceptable organic or inorganic carrier. The composition may be prepared in solid form, such as tablets or in liquid form such as a solution, suspension or emulsion. Suitable liquid carriers include water, gelatin, lactose, starch, talc, vegetable oils, alcohols, polyalcohols, gums, U.S.P. syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

The dosage of the present therapeutic agents will vary with the form of administration and the particular compound selected. Furthermore, it will vary with the particular subject being treated. Generally, treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will afford effective results without causing any harmful side effects and preferably at a level that is in the range of from about 10 mg. to about 400 mg. per day in a 70 kg. animal, although as aforementioned, variations will occur. However, a dosage level that is in the range of from about 20 mg. to about 200 mg. per day in a 70 kg. animal is desirably employed to achieve most effective results.

DESCRIPTION OF THE PREFERRED EMBODIMENTS

The following examples illustrate the preparation of a number of compounds contemplated by this invention. They are merely illustrative and are not to be construed to limit the scope thereof in any manner whatsoever.

The products in the following examples, for convenience, are designated by Roman numerals according to Table I:

TABLE I

| Compound | Name of Base |
| --- | --- |
| XIV | 2-methyl-3-(2-dimethylamino)ethyl-1-(phenylsulfonyl)indole. |
| XV | 2-methyl-3-(2-dimethylamino)ethyl-1-(p-tolylsulfonyl)indole. |
| XVI | 1-(p-methoxyphenylsulfonyl)-2-methyl-3-[(2-dimethylamino)ethyl]indole. |
| XVII | 1-(3,4-dichlorophenylsulfonyl)-2-methyl-3-[(2-dimethylamino)ethyl]indole. |
| XVIII | 1-benzyl-2-methyl-3-[(2-dimethylamino)ethyl]indole. |
| XIX | 1-(p-chlorobenzyl)-2-methyl-3-[(2-dimethylamino)ethyl]indole. |
| XX | 2-methyl-3-(2-dimethylamino)ethyl-1-(p-methylbenzyl)indole. |
| XXI | 2-methyl-3-(2-dimethylamino)ethyl-1-(p-methoxybenzyl)indole. |
| XXII | 1-cyclopropylcarbonyl-2-methyl-3-[(2-dimethylamino)ethyl]indole. |
| XXIII | 1-cyclopentylcarbonyl-2-methyl-3-[(2-dimethylamino)ethyl]indole. |
| XXIV | 1-cyclohexylcarbonyl-2-methyl-3-[(2-dimethylamino)ethyl]indole. |
| XXV | 2-methyl-3-(2-dimethylamino)ethyl-1-(4-methylvaleryl)indole. |
| XXVI | 3-(2-diethylamino)ethyl-2-methyl-1-(phenylsulfonyl)indole. |
| XXVII | 1-(p-chlorophenylsulfonyl)-3-(2-diethylamino)ethyl-2-methylindole. |
| XXVIII | 3-(2-diethylamino)ethyl-2-methyl-1-(p-tolylsulfonyl)indole. |
| XXIX | 3-(2-diethylamino)ethyl-1-(p-methoxyphenylsulfonyl)-2-methylindole. |
| XXX | 1-(3,4-dichlorophenylsulfonyl)-3-(2-diethylamino)ethyl-2-methylindole. |
| XXXI | 1-benzoyl-3-(2-diethylamino)ethyl-2-methylindole. |
| XXXII | 1-(p-chlorobenzyl)-3-(2-diethylamino)ethyl-2-methylindole. |
| XXXIII | 3-(2-diethylamino)ethyl-2-methyl-1-(p-methylbenzyl)indole. |
| XXXIV | 3-(2-diethylamino)ethyl-1-(p-methoxybenzyl)-2-methylindole. |
| XXXV | 3-(2-diethylamino)ethyl-1-(p-fluorobenzyl)-2-methylindole. |
| XXXVI | 1-cyclopropylcarbonyl-3-(2-diethylamino)ethyl-2-methylindole. |
| XXXVII | 1-cyclopentylcarbonyl-3-(2-diethylamino)ethyl-2-methylindole. |
| XXXVIII | 1-cyclohexylcarbonyl-3-(2-diethylamino)ethyl-2-methylindole. |
| XXXIX | 3-(2-diethylamino)ethyl-2-methyl-1-(4-methylvaleryl)indole. |
| XL | 1-(p-chlorobenzyl)-2-methyl-3-[(2-dipropylamino)ethyl]indole. |
| XLI | 2-methyl-1-(p-methylbenzyl)-3-[(2-dipropylamino)ethyl]indole. |
| XLII | 1-cyclopropylcarbonyl-2-methyl-3-[(2-dipropylamino)ethyl]indole. |
| XLIII | 2-methyl-3-(2-dipropylamino)ethyl-1-(p-tolylsulfonyl)indole. |
| XLIV | 2-methyl-1-(4-methylvaleryl)-3-[(2-dipropylamino)ethyl]indole. |
| XLV | 1-cyclohexylcarbonyl-3-2-ethyl-3-[(2-diethylamino)ethyl]indole. |
| XLVI | 2-ethyl-3-(2-diethylamino)ethyl-1-(4-methylvaleryl)indole. |
| XLVII | 2-ethyl-3-(2-diethylamino)ethyl-1-(phenylsulfonyl)indole. |
| XLVIII | 1-(p-chlorobenzyl)-2-ethyl-3-[(2-diethylamino)ethyl]indole. |
| XLIX | 1-cyclopropylcarbonyl-3-(2-diethylamino)ethyl-2-isopropylindole. |
| L | 3-(2-diethylamino)ethyl-2-isopropyl-1-(4-methylvaleryl)indole. |
| LI | 3-(2-diethylamino)ethyl-2-isopropyl-1-(p-methylbenzyl)indole. |

Example 1.—3-(2-diethylamino)ethyl-2-methyl-1-(phenylsulfonyl)indole

A solution of 8.07 g. 3-(2-diethylamino)ethyl-2-methyl indole in 200 ml. dry dimethylformamide (DMF) is stirred with 2.02 g. of about 50% sodium hydride-mineral oil dispersion for one hour at about 25° C., then 7.43 g. of benzene sulfonyl chloride in 30 ml. DMF is added dropwise with cooling (ice-water bath). When the addition is complete, the reaction mixture is stirred at about 25° C. for 18 hours and then is freed of solvent. The residue is dissolved in benzene, washed successively with dilute, aqueous potassium bicarbonate solution, water, dried (sodium sulfate) and the solvent is distilled. After solution in a minimum amount of benzene, the residue is chromatographically purified on a 250 g. column of neutral, activity III alumina. Elution with benzene-hexane combinations (1:9 to 1:1) affords a base which is dissolved in dry ether and treated with excess isopropanolic hydrogen chloride. The resulting salt is crystallized from acetone-ethyl acetate to provide the product as the hydrochloride (XXVI, 19%), M.P. 180–182° C., $\lambda^{KBr}_{max.}$ 4.22, 7.34, 8.47$\mu$, $\lambda^{95\%}_{max.}$ EtOH 252–262 ($\epsilon$14,100)m$\mu$ In a similar manner, the derivatives in Table II are prepared by reacting the appropriate indole with the indicated reactants.

TABLE II

| Table I Product | Reactant | Crystallizing solvent [1] | M.P., °C. | I.R., $\lambda_{max.}^{KBr}$ ($\mu$) | U.V. $\lambda_{max.}^{95\% EtOH}$ (m$\mu$) | $\epsilon 10^{-2}$ |
|---|---|---|---|---|---|---|
| XXVII | p-Cl$\phi$SO$_2$Cl | A-C, A-B | 168-170 | 4.22, 7.35, 8.49 | 252-260 | 164.0 |
| XXVIII | p-Me$\phi$SO$_2$Cl | A-B | 173-175 | 4.25, 7.35, 8.51 | 250-263 | 133.0 |
| XXIX | p-MeO$\phi$SO$_2$Cl | A | 148.5-151.0 | 4.37, 7.34, 7.39, 8.59 | 254 | 210.0 |
| XXX | 3,4-Cl$_2\phi$SO$_2$Cl | A-B | 178-179 | 4.27, 7.39, 8.49 | 254-260 | 153.3 |
| XXXI | $\phi$CH$_2$Cl | A-B | 143-145 | 3.91, 4.07 | 284-289 / 290-295 | 76.5 / 72.0 |
| XXXII | p-Cl$\phi$CH$_2$Cl | B | 143-145 | 4.23, 4.37 | 277-283 / 283-289 / 292-296 | 79.8 / 83.5 / 75.9 |
| XXXIII | p-Me$\phi$CH$_2$Br | A-B | 145-147 | 4.15 | 275-281 / 286.5 / 291-296 | 71.5 / 78.0 / 71.5 |
| XXXIV | p-MeO$\phi$CH$_2$Cl | B | 136-137 | 4.17 | 281-285 / 288 | 89.9 / 94.3 |
| XXXV | p-F$\phi$CH$_2$Cl [2] | B | 137.5-140.0 | 3.99, 4.26 | 274-281 / 282-289 / 294 | 65.0 / 68.8 / 65.0 |
| XXXVI | ▷—COCl | A | 166-168 | 4.18, 5.92 | 251-256 / 288-289 / 303 | 156.0 / 52.8 / 56.9 |
| XXXVII | ⬠—COCl [2] | B | 146-148 | 3.95, 4.17, 5.91 | 248-254 / 289-305 | 141.0 / 49.5 |
| XXXVIII | ⬡—COCl | A | 187-189 | 4.12, 5.92 | 251.5 / 290-306 | 151.0 / 49.0 |
| XXXIX | (Me)$_2$CH(CH$_2$)$_2$COCl | B | 127-128 | 4.15, 4.22, 5.87 | 247.5 / 290-305 | 157.0 / 53.8 |
| XVIII | $\phi$CH$_2$Br | A-B | 214-216 | 4.00, 4.15 | 286 / 291-295 | 79.7 / 73.4 |

[1] A=Acetone; B=Ethyl acetate; C=Hexane.
[2] Halo compound in DMF is added dropwise to the sodium salt-DMF solution at 25° C. and the mixture is stirred at 55° C. for 18 hours.

Example 2.—1-cyclopropylcarbonyl-2-methyl-3-[(2-dimethylamino)ethyl]indole

To 8.09 g. 2-methyl-3-[(2-dimethylamino)ethyl]indole in 200 ml. dry DMF is added 2.11 g. of about 50% sodium hydride-mineral oil dispersion and the mixture is stirred and heated at about 70° C. for one hour. The light brown solution is cooled to ca. 25° C. and treated dropwise with a solution of cyclopropylcarbonyl chloride and stirring continued at about 25° C. for 16 hours. After removal of the solvent, the residue is dissolved in benzene, washed with dilute aqueous potassium bicarbonate solution, water, dried (sodium sulfate) and the solvent evaporated. Solution of the oil in a minimum amount of benzene and purification on a 300 g. column of neutral activity III alumina affords, from the 1:1 benzene-hexane eluates, an oil which is dissolved in dry ether and treated with isopropanolic hydrogen chloride. Two recrystallizations (isopropanol) of the salt thus formed yields 1-cyclopropylcarbonyl-2-methyl-3-[(2-dimethylamino)ethyl]indole hydrochloride (XXII, yield 34%), dec. 244–246° C.

$\lambda_{max.}^{KBr}$ 3.92, 4.10, 5.91$\mu$, $\lambda_{max.}^{95\% EtOH}$ 249.5 ($\epsilon$ 16,450), 300 (5,980) m$\mu$ The derivatives in Table III are prepared by the same process employing the appropriate indole and the reactant shown. In two instances (XIV and XVIII) the products are characterized as the free bases.

TABLE III

| Table I Product | Reactant | Recrystallizing solvent [1] | M.P., °C. | I.R., $\lambda_{max.}^{KBr}$ ($\mu$) | U.V. $\lambda_{max.}^{95\% EtOH}$ (m$\mu$) | $\epsilon 10^{-2}$ |
|---|---|---|---|---|---|---|
| XIV [2] | $\phi$SO$_2$Cl | C | 77-78 | 3.69, 7.37, 8.56 | 253.5 | 138.0 |
| XV | p-Me$\phi$SO$_2$Cl | A | 214-215 | 4.17, 7.38, 8.54 | 251-259 | 134.8 |
| XVI | p-MeO$\phi$SO$_2$Cl | A-B | 206.5-208 | 4.19, 4.25, 7.33, 8.60 | 253 | 208.0 |
| XVII [2] | 3,4-(Cl)$_2\phi$SO$_2$Cl | C | 80-82 | 3.63, 7.27, 8.51 | 250 | 140.5 |
| XIX | p-Cl$\phi$CH$_2$Cl | A | 214.5-217.0 d | 3.93, 4.13 | 281 sh / 287 / 294.5 sh / 275 sh | 69.9 / 73.6 / 67.6 / 63.0 |
| XX | p-Me$\phi$CH$_2$Br | A | 194-196 | 3.92, 4.11 | 288 / 292-296 / 278-285 | 70.9 / 67.0 / 84.1 |
| XXII | p-MeO$\phi$CH$_2$Cl | A | 198-199 | 3.93, 4.08 | 286.5 / 293-296 | 88.5 / 70.9 |
| XXIII | ⬠—COCl | D | 237-239 | 3.93, 4.12, 5.89 | 248-254 / 290-304 | 149.7 / 46.3 |
| XXIV | ⬡—COCl | A-E | 235-237 | 3.91, 3.97, 4.07, 5.89 | 249.5 / 286-301 | 153.0 / 51.5 |
| XXV | (Me)$_2$CH(CH$_2$)$_2$COCl | A | 225-226 | 3.93, 5.87, 4.10 | 245 / 287-302 | 158.3 / 50.5 |

[1] A=Acetone; B=Ethyl acetate; C=Hexane; D=Isopropanol; E=Dichloromethane.
[2] Free base.

Example 3.—2-ethyl-3-(2-diethylaminoethyl)-1-(4-methylvaleryl)indole

Sodium hydride (1.58 g., about 50% mineral oil dispersion), 7.33 g. of 2-ethyl-3-[(2-diethylamino)ethyl] indole and 200 ml. dry DMF are stirred at 40-45° C. for 3 hours, 4.44 g. 4-methylvaleryl chloride is added dropwise and the mixture is maintained at 45° C. for 18 hours. The solvent is removed and the residue, dissolved in benzene, is washed with dilute aqueous potassium bicarbonate solution, water and dried (sodium sulfate). Distillation of the solvent provides a crude base which is dissolved in a minimal quantity of benzene and is chromatographically purified on a 300 g. column of neutral, activity III alumina. The purified base isolated from the hexane and benzene-hexane (1:9) eluates is dissolved in dry ether and treated with an equimolar quantity of maleic acid in anhydrous ether. Two recrystallizations (isopropanol-ether) of the salt so formed yield 2 - ethyl - 3 - (2 - diethylaminoethyl)-1-(4-methylvaleryl) indole maleate (XLVI, 19%), dec. 84–85° C.

$\lambda_{max.}^{KBr}$ 4.15, 5.87, 6.17, 6.38$\mu$, $\lambda_{max.}^{95\%}$ EtOH 245 ($\epsilon$ 16,200), 272 ($\epsilon$ 9,880), 293-301 ($\epsilon$ 5,390) m$\mu$ Employing the appropriate indole and the listed reactants, the compounds of Table IV are obtained in a similar manner. In two instances (XLI and XLII) the hydrochloride salts are prepared rather than the maleates.

3-(2-diethylaminoethyl)-1-(m-iodobenzyl)-2-t-butylindole;
1-(p-bromophenylsulfonyl)-3-[(2-diethylamino)ethyl]-2-methylindole;
3-(2-diethylaminoethyl)-1-(p-iodophenylphenyl-sulfonyl)-2-methylindole; and
1-(2,5-dibromophenylsulfonyl)-3-[(2-di-n-hexylamino)ethyl]-2-methylindole.

We claim:
1. A compound selected from those of the formula:

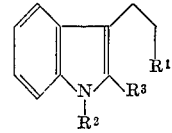

wherein: $R^1$ is di(lower) alkylamino; $R^2$ is (lower) alkanoyl, cycloalkylcarbonyl of from 4 to 7 carbon atoms, [benzyl], (lower) alkylbenzyl, (lower) alkoxybenzyl, halobenzyl], phenylsulfonyl, (lower)-alkylphenylsulfonyl, (lower)-alkoxyphenyl-sulfonyl, halophenylsulfonyl or dihalophenylsulfonyl; and $R^3$ is (lower) alkyl, and pharmaceutically acceptable acid addition salts thereof.

2. A compound as defined in claim 1, which is 1-cyclopropylcarbonyl - 2-methyl - 3-[(2-dimethylamino)ethyl] indole.

TABLE IV

| Table I Product | Reactant | Crystallizing solvent[1] | M.P., °C. | I.R. $\lambda_{max.}^{KBr}$ ($\mu$) | U.V. $\lambda_{max.}^{KBr}$ EtOH (m$\mu$) | $\epsilon 10^{-2}$ |
|---|---|---|---|---|---|---|
| XLV | ⬡—COCl | A–B | 114–116 | 4.08, 5.85, 6.17, 6.36 | 250 / 290–303 | 156.0 / 48.3 |
| XLVII | $\phi$SO$_2$Cl | A–B | 105–106 | 4.25, 5.89, 6.18, 6.35, 7.41, 8.52 | 257.5 | 138.5 |
| XLVIII | p-Cl$\phi$CH$_2$Cl | A–B | 127–128 | 4.10, 5.87, 6.18, 6.38 | 276.5 sh / 282.5 / 290.5 | 80.2 / 82.9 / 74.9 |
| XLIX | ▷—COCl | A–B | 67–69 dec | 3.87, 5.87, 6.17 sh, 6.35 | 255 / 291–302 | 140.0 / 52.4 |
| L | (Me)$_2$CH(CH$_2$)$_2$COCl | A–B | 122–124 | 4.17, 5.84, 6.18, 6.37 | 253 / 272 sh / 292–302 | 140.0 / 105.0 / 46.6 |
| LI | p-Me$\phi$CH$_2$Br | A–B | 147–149 | 4.10, 5.87, 6.17, 6.35 | 285 / 292 | 82.6 / 78.1 |
| XL | p-Cl$\phi$CH$_2$Cl | A–B | 91–92 | 4.12, 5.86, 6.18, 6.38 | 285 | 79.0 |
| XLI[2] | p-Me$\phi$CH$_2$Br | C | 106–108 | 4.17 | 283.5 / 294 sh. | 76.0 / 65.6 |
| XLII[2] | ▷—COCl | C | 148–150 | 4.15, 5.95 | 250 / 302 | 161.0 / 60.5 |
| XLIII | p-Me$\phi$SO$_2$Cl | A–B | 112–114 | 4.28, 5.90, 6.17, 6.30, 7.37, 8.55 | 255 | 136.0 |
| XLIV | (Me)$_2$CH(CH$_2$)$_2$COCl | A–B | 118–120 | 3.90, 5.89, 6.19, 6.33 | 242 / 275 sh / 287–303 | 169.5 / 88.6 / 49.1 |

[1] A=Isopropanol; B=Diethyl ether, C=ethyl acetate.
[2] Hydrochloride salt.

Example 4

The procedures of Examples 1 to 3 are repeated substituting stoichiometrically equivalent amounts of appropriately substituted indoles and halides and the following additional compounds within the scope of this invention are prepared:

1-(p-butoxybenzyl)-3-[2-(diethylamino)ethyl]-2-ethylindole;
1-(p-bromobenzyl-3-)2-diethylaminoethyl-2-n-hexylindole;

3. A compound as defined in claim 2 in the form of an acid addition salt with hydrogen chloride.
4. A compound as defined in claim 1, which is 1-cyclopentylcarbonyl - 2 - methyl-3-[(2-dimethylamino)ethyl] indole.
5. A compound as defined in claim 4 in the form of an acid addition salt with hydrogen chloride.
6. A compound as defined in claim 1, which is 1-(3,4-dichlorophenylsulfonyl) - 3 - (2 - diethylamino)-ethyl-2-methylindole.
7. A compound as defined in claim 6 in the form of an acid addition salt with hydrogen chloride.

8. A compound as defined in claim 1, which is 1-cyclohexylcarbonyl-2-ethyl-3-[(2-diethylamino)ethyl]indole.

9. A compound as defined in claim 8 in the form of an acid addition salt with maleic acid.

10. A compound as defined in claim 1, which is 1-cyclopropylcarbonyl - 3-(2 - diethylamino)ethyl - 2-isopropylindole.

11. A compound as defined in claim 10 in the form of an acid addition salt with maleic acid.

12. 3 - (2-diethylamino)-ethyl-2-isopropyl-1-(p-methylbenzyl) indole.

13. A compound as defined in claim 12 in the form of an acid addition salt with maleic acid.

References Cited

Ehrhart et al.: Chem. Abs., vol. 56, 440i, abst. of Arch. Pharm. 294-550-5 (1961).

Thesing et al.: Chem. Abs., vol. 62-10398h, abst. of Ann. Chem. 680-52-9 (1964).

ALEX MAZEL, Primary Examiner

J. A. NARCAVAGE, Assistant Examiner

U.S. Cl. X.R.

260—326.14, 326.15; 424—274